United States Patent [19]
Goossen

[11] Patent Number: 5,825,528
[45] Date of Patent: Oct. 20, 1998

[54] PHASE-MISMATCHED FABRY-PEROT CAVITY MICROMECHANICAL MODULATOR

[75] Inventor: Keith Wayne Goossen, Aberdeen, N.J.

[73] Assignee: Lucent Technologies Inc., Murray Hill, N.J.

[21] Appl. No.: 578,123

[22] Filed: Dec. 26, 1995

[51] Int. Cl.⁶ .................................................. G02B 26/00
[52] U.S. Cl. ...................... 359/291; 359/247; 356/352
[58] Field of Search ................................... 359/247, 290, 359/291, 318; 356/352

[56] References Cited

PUBLICATIONS

Aratani et al., "Process and Design Considerations for Surface Machined Beams for a Tunable Interferometer Array in Silicon," Proceedings of the IEEE Micro. Electro-Mech. Workshop, Ft. Lauderdale, Fla., Feb. 7–10, 1993, pp. 230–235.

Macleod, H.A., "Multilayer High–Reflectance Coatings," Chapt. 5 of *Thin Film Optical Filters*, pp. 158–159, (Adam Hilger Ltd. 1986).

Marxer et al., "MHz Opto–Mechanical Modulator," Transducers '95—Eurosensors IX, Royal Swedish Academy of Eng. Sciences, Stockholm (Jun. 1995), pp. 289–292.

Solgaard et al., "Deformable Grating Optical Modulator," vol. 17 No. 9, Optics Lett., (May 1992) pp. 688–690.

*Primary Examiner*—David C. Nelms
*Assistant Examiner*—Dawn-Marie Bey

[57] ABSTRACT

An apparatus for modulating an optical signal and a method for fabricating such an apparatus, are disclosed. The apparatus, which may be formed on a semiconductor wafer or chip, consists of a membrane that is supported over a substrate by flexible support arms. An air gap is defined between the membrane and substrate. The membrane thickness and refractive index are chosen so that the reflectivities of the membrane and substrate are not 180° out of phase. Under the action of bias, the membrane moves vertically from a first position to a second position relative to the substrate, changing the air gap. The reflectivity of the modulator changes as the air gap changes. Membrane thickness and the air gap are suitably selected to achieve zero overall modulator reflectivity in one of the two membrane positions. Equations define acceptable values for the thickness of the membrane thickness and the air gap. The membrane and air gap are formed by various etching and photolithographic methods.

22 Claims, 10 Drawing Sheets

PHASE-MISMATCHED FABRY-PEROT CAVITY MICROMECHANICAL MODULATOR

FIELD OF THE INVENTION

The present invention relates to micromechanical optical modulators. More particularly, the present invention relates to a phase-mismatched Fabry-Perot cavity micromechanical optical modulator.

CROSS REFERENCE TO RELATED APPLICATIONS

This application is related to co-pending U.S. patent applications Ser. No. 08/187,676 filed Jan. 27, 1994, Ser. No. 08/283,106 filed Jul. 29, 1994, Ser. No. 08/478,590 filed Jun. 7, 1995 and Ser. No. 08/479,476 filed Jun. 7, 1995.

BACKGROUND OF THE INVENTION

It is desirable in optical wavelength-division-multiplexing networks to have inexpensive light modulators that have high contrast and wide optical bandwidths. In certain cases, such as audio and video transmission, these modulators need only operate at frequencies up to several megahertz.

A device potentially well suited for the above application is the surface normal micromechanical modulator. This device may be described as having a variable air gap defined by two layers of material, typically a membrane and a substrate. Varying the air gap by causing the membrane to move alters the optical properties of the device. Typically, such modulators have two states corresponding to two different membrane positions. In one state, a minimal portion of the optical energy incident upon the modulator is returned in the surface normal direction. In the second state, a significantly greater portion of the incident optical energy is so directed. The aforementioned modulators are typically actuated, i.e., the air gap is changed, by electrostatic forces.

Micromechanical modulators have been based on several different operating principles. For example, Solgaard et al. describe a modulator based on a phase grating. See "Deformable Grating Optical Modulator," Optics Lett. 17(9) 688–90 (1992). This article, and all other articles and patent applications referenced in this specification are herein incorporated by reference in their entirety.

A second modulator design is based on the Fabry-Perot interferometer. In typical Fabry-Perot-based designs, two mirrors, each having high reflectivity, are placed in parallel relation to one another and are separated by an air gap. Typically, the mirrors are embodied as a multi-layer membrane and a multi-layer placed on a substrate. As a voltage is applied between the membrane and substrate, the air gap decreases in size. The reflectance of the modulator is sinusoidally dependent on the size of the air gap. Maximal modulator performance, i.e., contrast, is achieved if the reflectivity of the Fabry-Perot modulator is zero in one state. This occurs only if the mirrors have reflectivities of equal magnitude.

The substrate and membrane of typical Fabry-Perot modulators are high reflectivity multi-layer dielectrics that form cavities or air gaps having a narrow spectral bandwidth. Producing such multi-layer mirrors with equal reflectivity requires close attention to manufacturing tolerances. Furthermore, in view of the narrow spectral bandwidth, such devices may not be suitable for WDM applications. As such, these devices are more favorably operated as tunable narrow line width filters.

To increase the spectral bandwidth of Fabry-Perot modulators, low reflectivity mirrors can be used. See, for example, Ser. No. 08/187,676, assigned to the assignee of the present invention, wherein a broad-bandwidth modulator is described which incorporates a membrane having one or more layers as the upper mirror and a substrate for the lower mirror. This modulator was constrained to using mirrors having opposite-phase reflectivities. It is typical for earlier Fabry-Perot modulators to include membrane and substrate layers having reflectivities that are opposite in phase as well as being equal in magnitude. See for example, Marxer et al., "MHz Opto-Mechanical Modulator," Transducers '95—Eurosensors IX, Royal Swedish Academy of Engineering Sciences, Stockholm (June 1995), pp. 289–292 and Aratani et al. in "Process and Design Considerations for Surface Micromachined Beams for a Tuneable Interferometer Array in Silicon," Proc. IEEE Microelectromech. Workshop, Ft. Laud., Fla., Feb. 7–10, 1993 at 230–35. By using such opposite-phase mirrors, the modulator was restricted to a membrane having a refractive index that is approximately equal to the square root of the refractive index of the substrate. It would be desirable, however, to fabricate broad-bandwidth modulators from membranes having a broader range of allowable refractive indices. Thus, there is a need for an improved broad-bandwidth Fabry-Perot based optical modulator.

SUMMARY OF THE INVENTION

An apparatus for modulating an optical signal, and a method for fabricating such an apparatus, are disclosed. In one embodiment, the modulator consists of a membrane suspended over a substrate by flexible support arms. An air gap is formed between the membrane and substrate. The thickness and refractive index of the membrane are selected so that the membrane and substrate have reflectivities with a phase deviation of other than 180°.

In operation, a bias voltage is applied to the membrane and the substrate generating an electrostatic force that moves the membrane toward the substrate. As the membrane moves, the air gap changes. The reflectivity of the modulator changes as the membrane moves from its unbiased position. The change in reflectivity facilitates modulating the optical signal. Membrane thickness and the modulator air gap are suitably selected to achieve zero overall modulator reflectivity in one membrane position.

The membrane and air gap are formed by various etching and photolithographic methods. The materials forming the membrane and substrate are selected so that the refractive index of the membrane is greater than the square root of the refractive index of the substrate.

BRIEF DESCRIPTION OF THE DRAWINGS

Further features of the invention will become more apparent from the following detailed description of specific embodiments thereof when read in conjunction with the accompanying drawings, in which like elements have like reference numerals and in which.

DETAILED DESCRIPTION OF THE INVENTION

Figure 1:
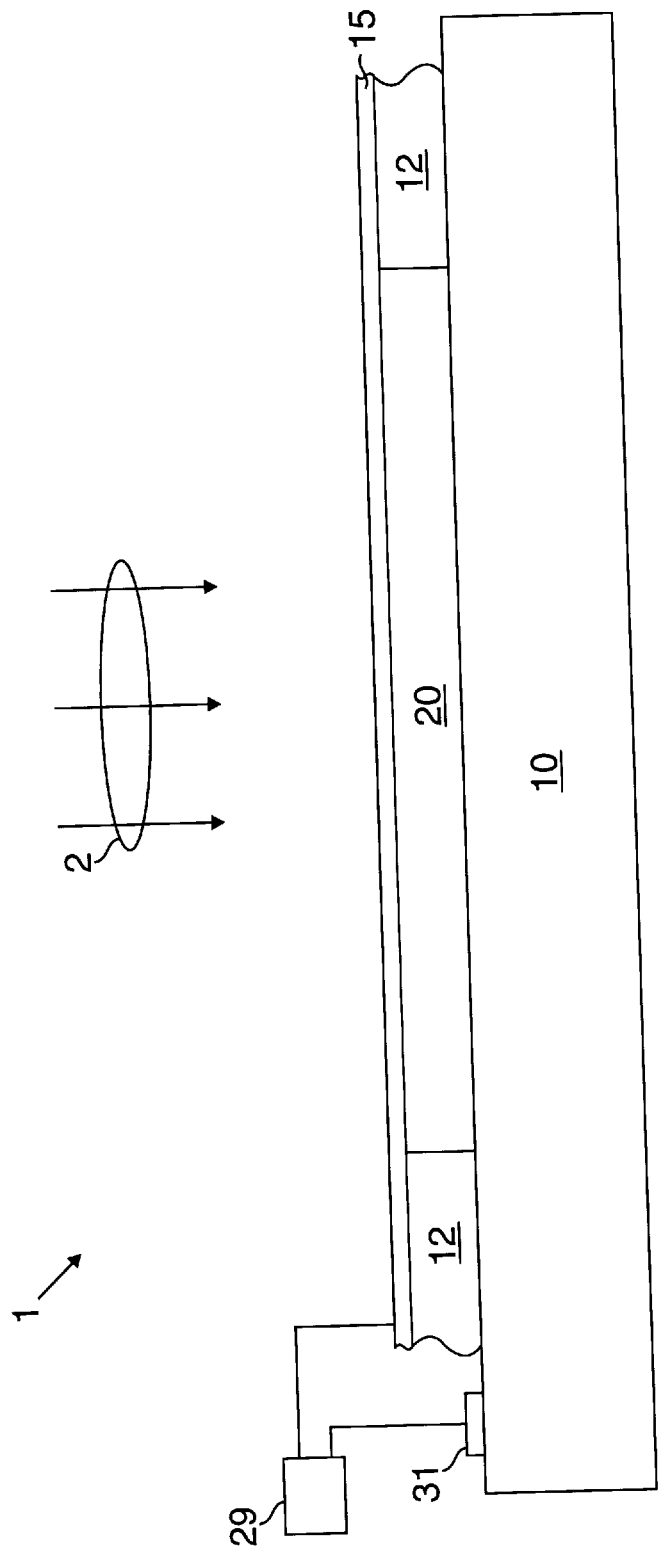
FIG. 1 is a side view of a preferred embodiment of a micromechanical modulator according to the present invention wherein the modulator is shown in its unbiased position.
Figure 2:
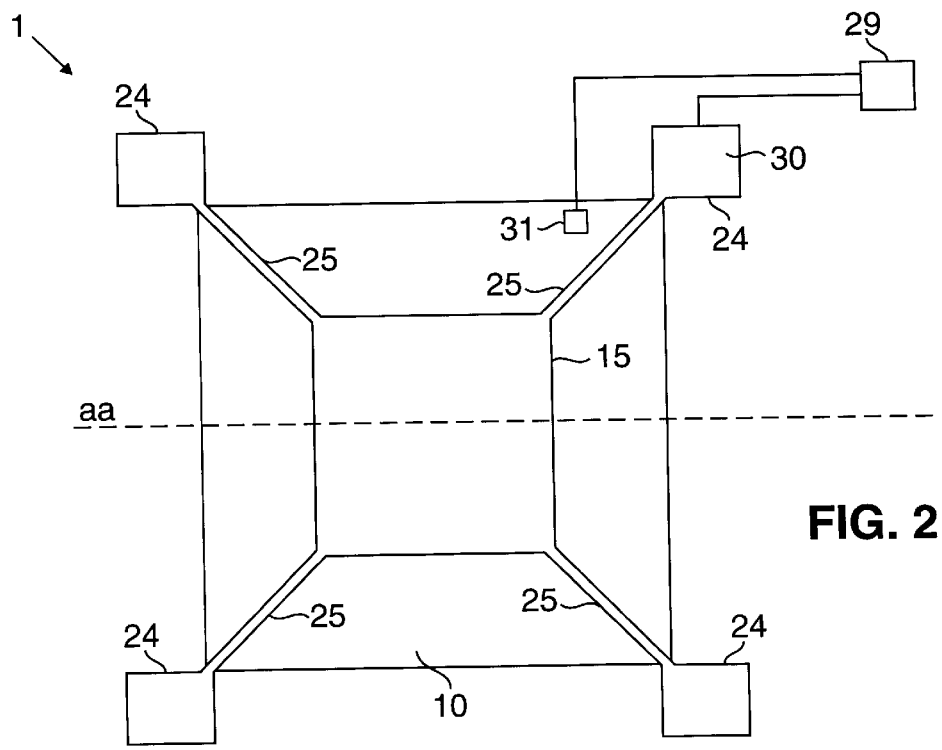
FIG. 2 is a plan view of the micromechanical modulator of FIG. 1.

FIGS. 1 and 2 show a preferred embodiment of a micromechanical modulator 1 according to the present invention. As shown in FIG. 1, which is a cross-sectional view through line a—a in FIG. 2, the device comprises a substrate 10 and a membrane 15.

Figure 3:
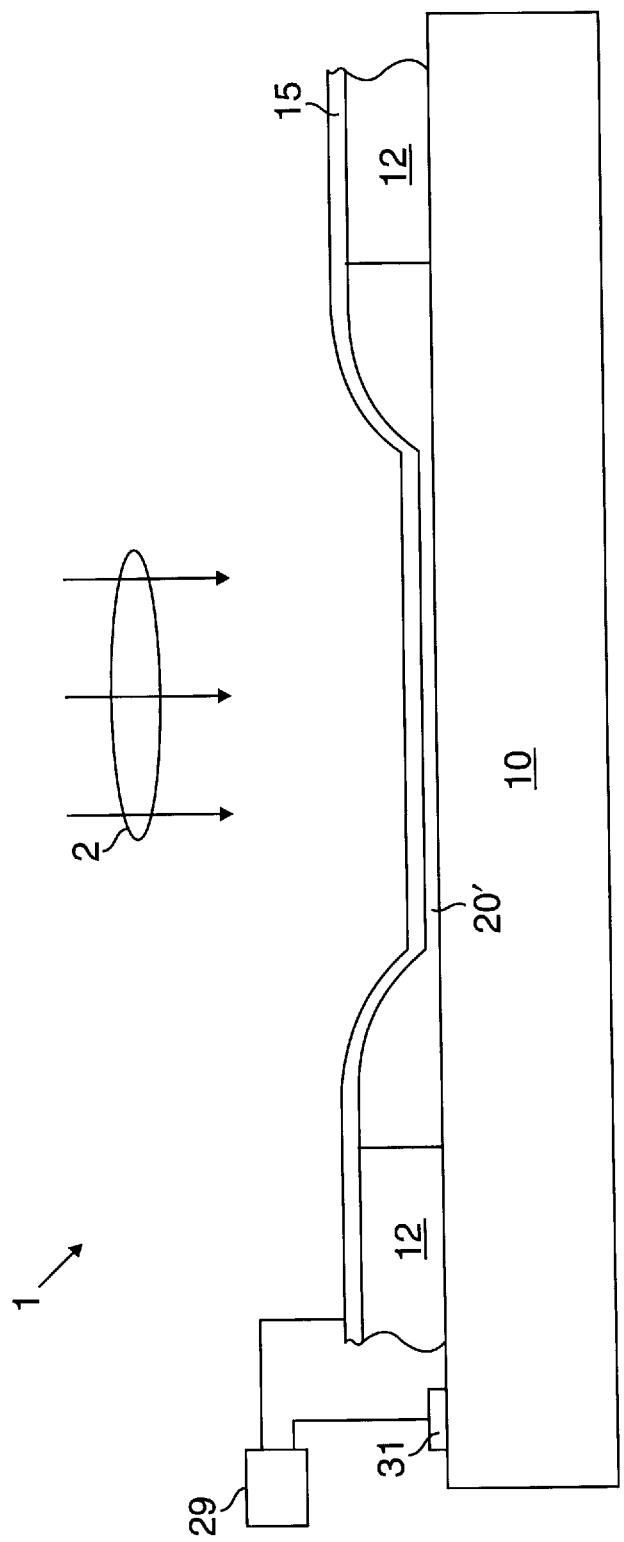
FIG. 3 shows the modulator of FIG. 1 under bias.

The membrane 15 and substrate 10 are spaced from each other defining an air gap 20 between them. As shown in FIG. 2, which is a plan view of the apparatus of FIG. 1, the membrane 15 is suspended over the air gap 20 by support arms 25. The substrate 10 and the membrane 15 should be suitably conductive so that a biasing signal may be applied across them generating an electrostatic force. This force causes the membrane 15 to move toward the substrate, as shown in FIG. 3. As the membrane 15 moves from its unbiased position, the reflectivity of the device to an incident optical signal 2 changes. The biasing signal can be supplied by a controlled voltage source 29. A contact 31 may be formed on the substrate 10 to facilitate electrical connection with the controlled voltage source 29. An additional contact, not shown, may be formed to facilitate electrical connection between the membrane and the controlled voltage source. The modulator may be suitably formed on a semiconductor chip or wafer.

Preferably, the substrate 10 is formed of a conductive material, which is either transparent or absorbing over the operating optical bandwidth. Suitable materials include, but are not limited to, silicon, gallium arsenide, indium phosphide, germanium or indium tin oxide (ITO) coated glass. If a semiconductor material is used for the substrate, it should preferably be appropriately doped. For example, if the substrate is silicon, it is preferably doped with any Group III or Group V element, typically phosphorus or boron. Such doping should enhance device speed.

If the substrate is formed of a material that is insufficiently conductive for a modulator according to the present invention, conductivity can be increased or imparted by doping the substrate with suitable materials. Doping methods include ion implantation, selective diffusion and other methods known to those skilled in the art.

The membrane 15 is preferably comprised of a single layer of material which is transparent at the operating wavelengths of the modulator and is characterized by a refractive index that is greater than the square root of the refractive index of the substrate 10. Using a silicon substrate, suitable materials for the membrane 15 include, without limitation, silicon oxide, or, more preferably, silicon nitride. Particularly preferred are higher index silicon-rich nitrides, which have higher resistance to hydrofluoric (HF) based etches than lower index, lower silicon content nitrides. In a particularly preferred embodiment, the membrane 15 is polysilicon. Polysilicon can be doped so that it is conductive, dispensing with the need for an additional conductive layer as discussed further below.

Figure 5:
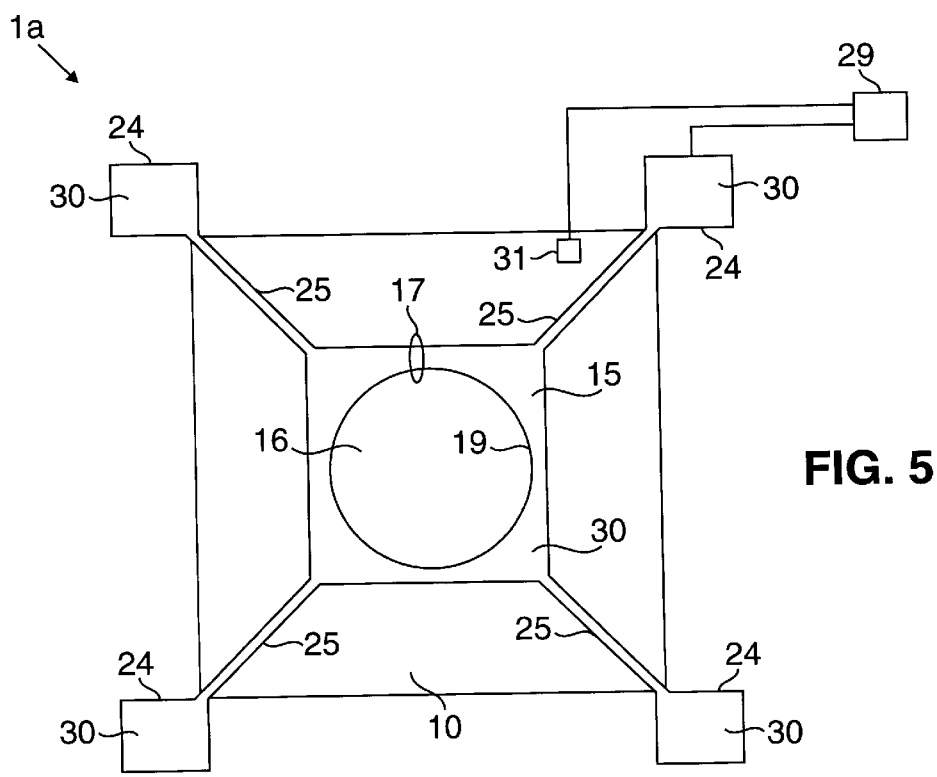
FIG. 5 is a plan view of the micromechanical modulator of FIG. 4.
Figure 4:
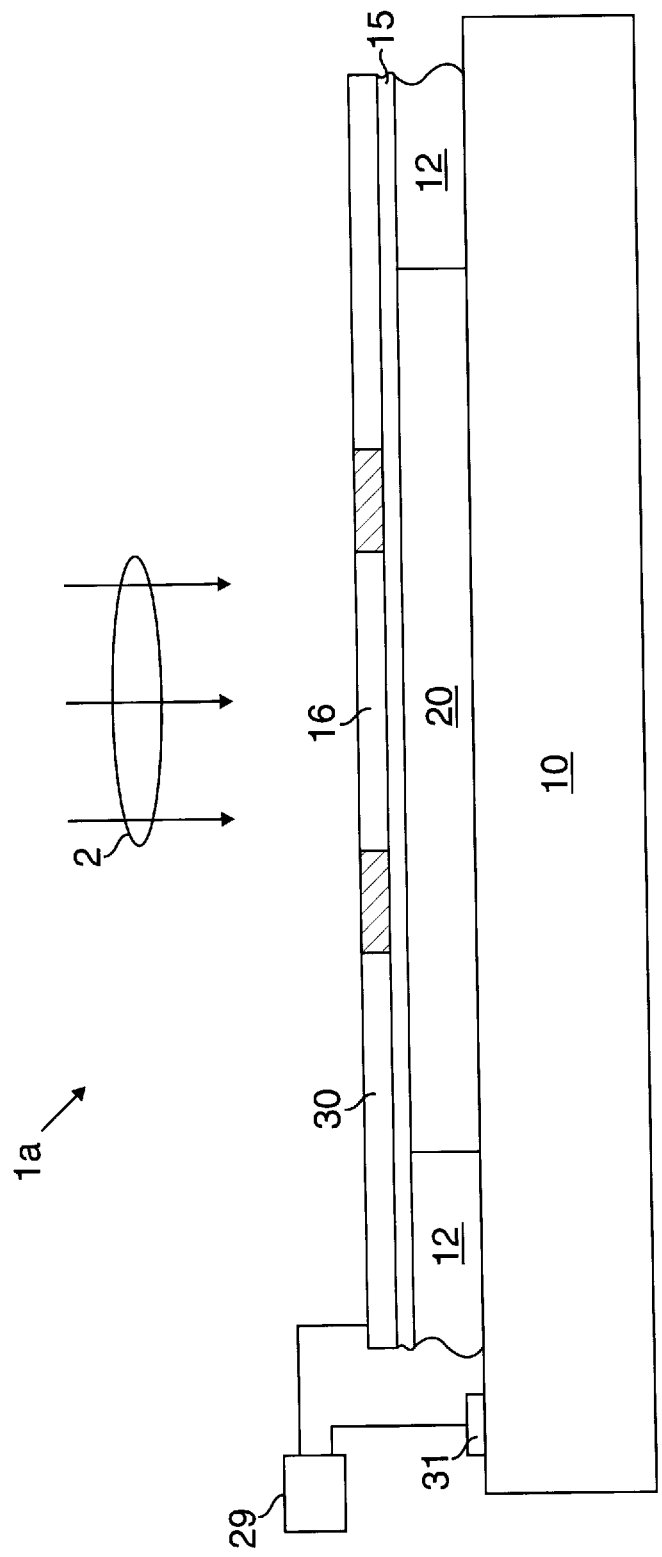
FIG. 4 is a side view of a second embodiment of a micromechanical modulator according to the present invention wherein the modulator is shown in its unbiased position and a layer of conductive material is disposed on the membrane.

If the material comprising the membrane 15 is not suitably conductive for a modulator according to the present invention, a layer of conductive material 30 may be deposited on it, as shown in the embodiment of a modulator 1a shown in FIGS. 4 and 5. Any suitably conductive material may be used to form the conductive layer 30, including, without limitation, aluminum, platinum, tungsten, conducting silicon, ITO or gold.

If the conductive layer 30 is optically opaque over the operating bandwidth of the modulator, then an optical window 16 must be provided through the conductive layer. In the embodiment 1a shown in FIGS. 4 and 5, the conductive layer 30 covers the support arms 25 and the perimeter of the membrane 15 forming a border region 17. The inner edge 19 of the border region 17 defines an optical window 16 in the membrane 15. The conductive layer 30 may further cover a region 24 extending beyond each support arm 25.

While the optical window 16 is shown to have a circular shape in FIG. 5, it should be appreciated that the window 16 may have other suitable shapes. Further, it will be recognized that the size of the optical window may vary for different applications. It will be appreciated by those skilled in the art that the optical window 16 is preferably sized so that the optical "spot" produced by the optical window will be captured by the numerical aperture of the waveguide or other optical device being used in conjunction with the invention. Further, it should be appreciated that a discrete "window," such as the optical window 16, is not required in the conductive layer 30 if it is optically transparent. An optically transparent conductive layer can be formed from ITO.

It should be understood that the presence of a conductive layer 30 increases the drive voltage requirements and may reduce modulator response time. Thus, it is preferable to avoid using such a separate conductive layer 30.

The flexible support arms 25 serve as a support means for the membrane 15 and also allow the membrane to move relative to the substrate. The flexible support arms 25 that suspend the membrane 15 above the substrate 10 may be arranged in any convenient manner and may number more or less than the four arms pictured in FIGS. 2 and 5. Additional support arm designs are shown in co-pending applications Ser. No. 08/283,106 and Ser. No. 08/478,590. Other configurations and arrangements capable of supporting the membrane 15, and allowing it to move, are within the contemplated scope of the present invention; it being recognized that such variations will occur to those skilled in the art in view of the present teachings.

In a modulator according to the present invention, the membrane 15 and the substrate 10 are formed so that the magnitude of their reflectivities are approximately equal while the phases of their reflectivities are unconstrained. This is in contrast to a typical prior art Fabry-Perot modulator, wherein the membrane and substrate are formed so that the magnitude of the reflectivities of the membrane and substrate are equal and the phases are opposite, i.e., 180° apart. As used herein, the term "phase-mismatched" refers to the present modulators wherein the phase deviation of the reflectivities of the membrane 15 and substrate 10 is not 180°.

For typical prior art high-contrast Fabry-Perot modulators having a single-layer membrane, achieving equal magnitude and opposite-phase reflectivities results in a simple to implement yet constrained design. Simple in that the air gap in one state is one-half of a wavelength of the optical signal being modulated. In that state, the reflectivities of the membrane and the substrate add destructively resulting in an overall reflectivity of zero for the modulator. Furthermore, the membrane thickness of such a modulator is simply one-quarter of a wavelength of the optical signal as measured within the membrane. Yet, such a modulator is constrained in that the refractive index of the membrane must be approximately equal to the square root of the refractive index of the substrate.

The phase-mismatched modulator of the present invention enables a multitude of designs that are not possible according to the teachings of the prior art. By allowing the phase deviation to vary from 180°, the membrane may be fabricated so that it has any refractive index greater than the square root of the refractive index of the substrate.

By avoiding the refractive index limitation of the prior art, the membrane 15 of the present modulators may be formed from a greater selection of materials. Such a greater selection includes conductive and highly HF-resistant materials. Forming a modulator membrane, such as the membrane 15, from such materials simplifies certain aspects of fabricating the modulator and may increase modulator response speed. Design equations for the phase-mismatched Fabry-Perot modulator of the present invention are presented below.

The normal incidence reflectivity of the membrane 15 is given by the following expression:

$$\rho=(1-n^2)\sin(kt)/[(n^2+1)\sin(kt)+2\text{ in }\cos(kt)] \quad [1]$$

wherein t is the thickness of the membrane, n is the refractive index of the membrane, and $k=2\pi n/\lambda$. $\lambda$ is the wavelength of the optical signal 2 being modulated. It will be appreciated that the incident optical signal 2 may be comprised of a number of spectral components of differing wavelengths $\lambda_1 \ldots \lambda_N$. For example, the incident optical signal 2 may have a bandwidth extending from 1400 nm to 1700 nm. In such a case, the wavelength $\lambda$ selected for use in the design equations is determined by selecting the wavelength at the mid-point, i.e., the center wavelength, of the bandwidth. The center wavelength is 1550 nm for the previous example. Some loss in modulator performance, i.e, contrast, may be experienced as the wavelength of the spectral components deviates from the center wavelength.

Figure 6:
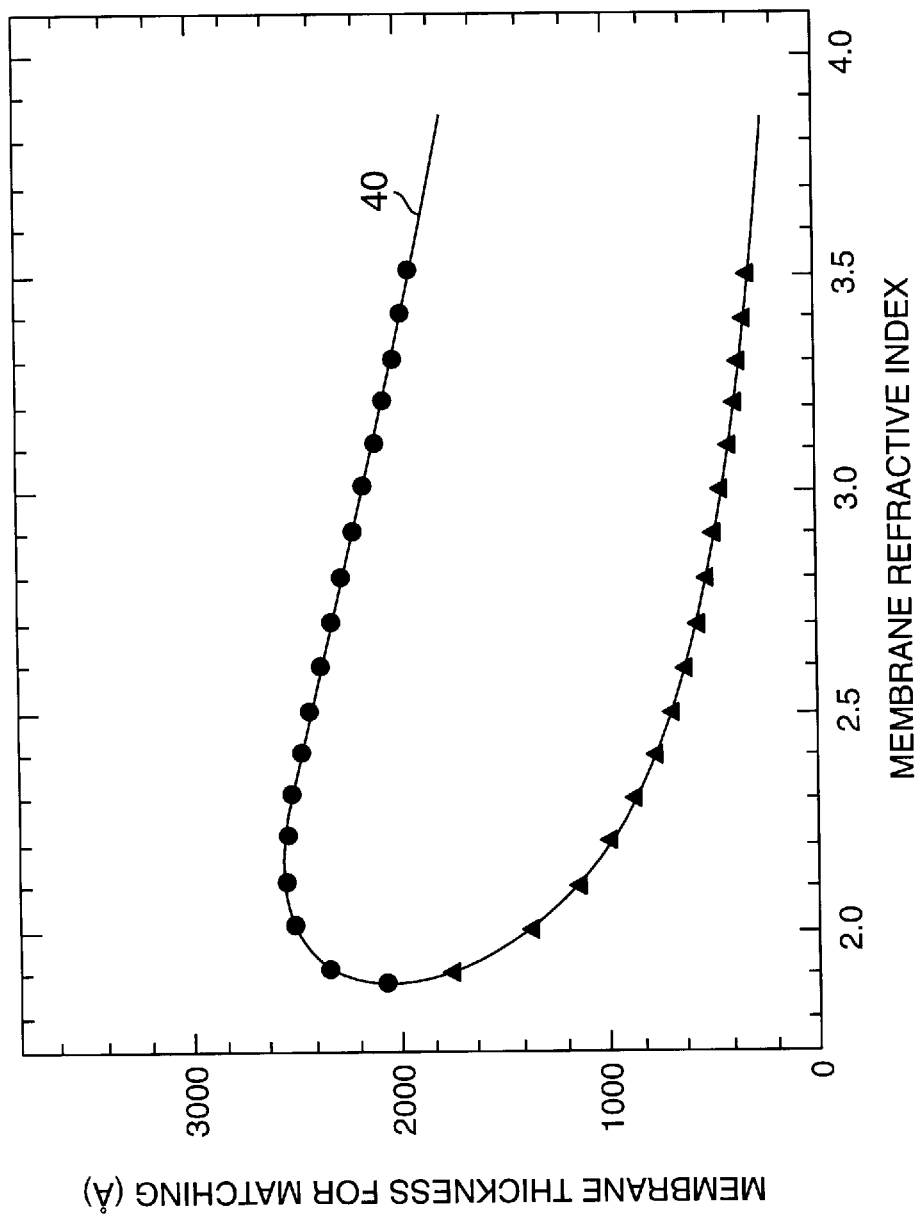
FIG. 6 is a graphical solution of an equation for calculating membrane thickness.

The normal incidence reflectivity of the substrate is given by:

$$\rho \rho_s = (n_s-1)/(n_s+1) \quad [2]$$

wherein $n_s$ is the refractive index of the substrate. Setting the magnitude of $\rho$ equal to the magnitude of $\rho_s$ allows two solutions, i.e, acceptable membrane thicknesses, as follows:

$$t=\lambda/(2\pi n)\{\pi/2+j\pi\pm\tan^{-1}[(n^2+1)(f-1)^{1/2}/2n]\} \quad [3]$$

wherein $f=[(n^2-1)/(n^2+1)]^2/[(n_s-1)/(n_s+1)]^2$ and j=0. Note that n must be greater than the square root of $n_s$ for [3] to have real solutions. The solution to [3] is shown graphically in FIG. 6. for the case of an optical signal having a wavelength of 1550 nm and a substrate with a refractive index of 3.5.

It will be appreciated by those skilled in the art that there are additional solutions to [3]. Such other solutions are obtained by increasing the optical signal roundtrip through the air gap 20 and membrane 15 by $\pi$. This factor appears in [3] as "$j\pi$". Thus, reference numeral 40 depicts the j=0 solution. Other embodiments for j=1 to N are possible, but would be less desirable since the membrane would be thicker in such other embodiments. Thicker membranes result in slower modulator response times.

As previously noted, for any suitable membrane refractive index, there are two solutions to [3] for j=0. For example, referring to FIG. 6, if the refractive index of the membrane is 3.5, then membrane thickness can be about 300 angstroms (Å) or about 1900 Å.

As discussed above, in prior art Fabry-Perot modulators wherein the membrane and substrate have equal magnitude but opposite phase reflectivity, the air gap required for zero modulator reflectivity is $\lambda/2$. In a phase-mismatched modulator according to the present invention, however, the air gap for zero modulator reflectivity is not $\lambda/2$. The phase difference from 180 degrees between the membrane 15 and substrate 10 is given by:

$$\phi=\tan^{-1}[(f-1)^{1/2}]. \quad [4]$$

To compensate for the phase change, the air gap 20 must change as follows:

$$\Delta=\phi\lambda/4\pi. \quad [5]$$

The required air gap 20 for zero modulator reflectivity is therefore:

$$d=\lambda/2\{1\mp\tan^{-1}[(f-1)^{1/2}]/(2\pi)\}. \quad [6]$$

Equation [6] provides two solutions. Thus, for any refractive index $n>n_s^{1/2}$, there are two suitable modulator embodiments. A first embodiment incorporates a relatively thinner membrane 15 and a relatively larger air gap 20. A second embodiment uses a relatively thicker membrane 15 and a relatively smaller air gap 20. The solution to [6] is identified by the reference numeral 45 in FIG. 7.

Figure 7:
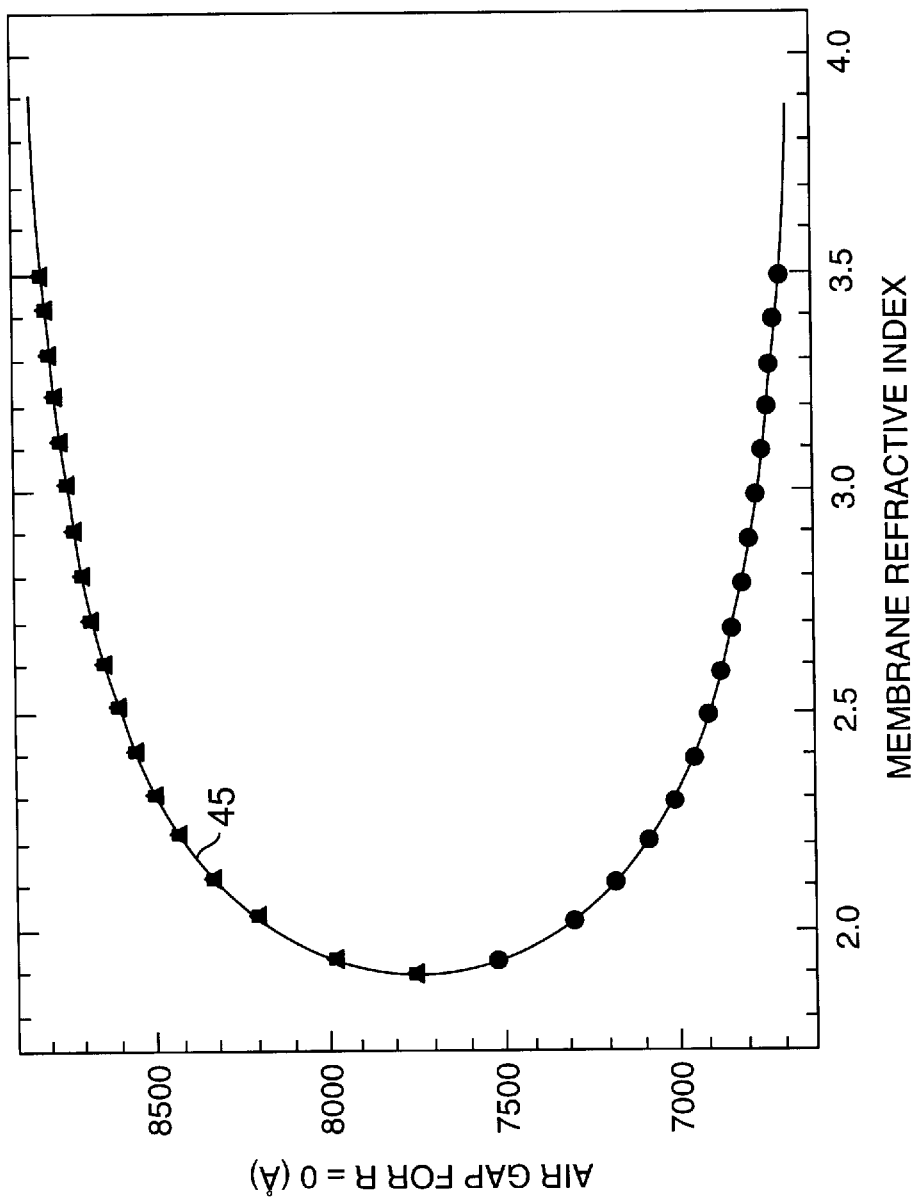
FIG. 7 is a graphical solution of an equation for calculating the size of the air gap.

Continuing with the previous example of a membrane having a refractive index of 3.5, FIG. 7 indicates that zero modulator reflectivity can be achieved at air gaps of about 6660 Å and about 8800 Å. Thus, two embodiments of a high contrast modulator according to the present invention having a substrate with a refractive index of 3.5 and for processing an optical signal having a wavelength of 1550 nm can be suitably implemented. In the first of such embodiments, the modulator, in one position, has an air gap of about 8800 Å and a membrane having a refractive index of 3.5 and a thickness of about 300 Å. The second of such embodiments incorporates an air gap of about 6660 Å and a membrane characterized by the same refractive index of 3.5 and a thickness of about 1900 Å.

Figure 8:
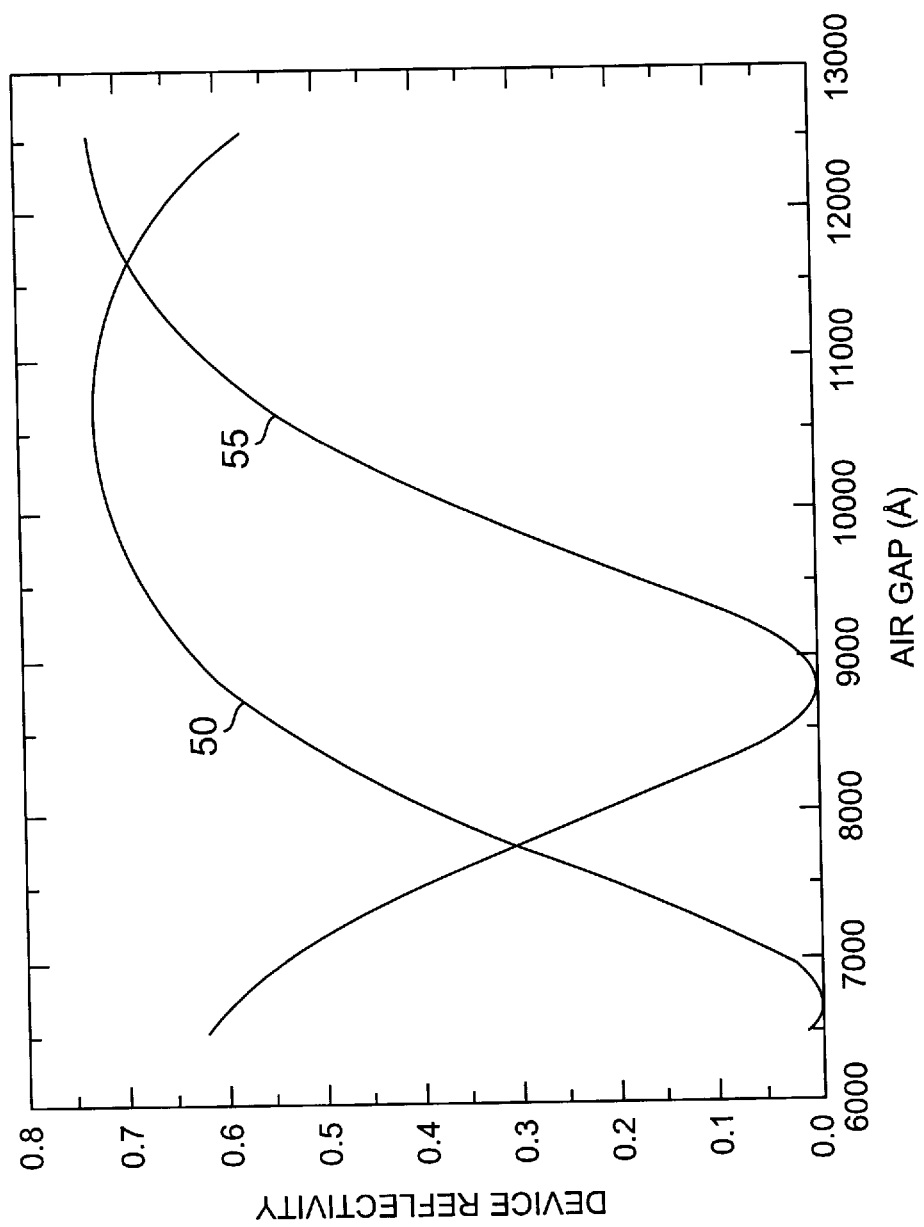
FIG. 8 is a plot of modulator reflectivity as a function of air gap for two embodiments of a modulator according to the present invention.

The optical performance of the aforementioned two embodiments are illustrated in FIG. 8. In the first embodiment, identified by the reference numeral 50, modulator reflectivity is zero for an air gap of about 6660 Å and is at a maximum of about 72 percent at about 10,535 Å. Performance is similar for the second embodiment, identified by the reference numeral 55, with the exception that modulator reflectivity is zero at an air gap of about 8800 Å and at a maximum at about 12,675 Å.

It will be appreciated by those skilled in the art that relative maxima and minima reflectivity states are observed at air gaps that are successive integer multiples of one-quarter of the operating wavelength. For example, if a minima reflectivity state is observed at a particular air gap, relative maxima will occur as the air gap deviates by odd multiples of one-quarter of the operating wavelength, i.e, $m\lambda/4$ where m=1, 3, 5, etc. Thus, for the first embodiment discussed above, relative maxima will be observed at air gaps of 6660±15500/4 or 2785 Å and 10,535 Å, which is the case of m=1. Relative minima will occur when the air gap deviates from a minima by even multiples of one-quarter of the operating wavelength, i.e., $m\lambda/4$ where m=2, 4, 6, etc. Thus, for example, relative minima will be observed at air gaps of 6660 Å±15500/(2/4) Å or 14410 Å, which is the case of m=2. In this case the minima at 6660 Å–(2)$\lambda/4$ can not be realized since the minimum possible air gap is zero.

While the aforementioned relation concerning relative minima and maxima suggest a wide variety of physical embodiments, operating a modulator according to the present invention at larger air gaps, i.e, larger values of m, increases drive voltage and decreases modulator response speed. As such, in a preferred embodiment, the modulator is designed so that the air gap 15 will range from d to d±$\lambda/4$. Thus, in one embodiment, the air gap 15 may be equal to d when the membrane is unbiased. In this condition, modulator reflectivity is zero. A reflectivity maxima will then occur at d–$\lambda/4$, when the membrane is under bias, as shown in FIG. 3. In a second embodiment, the air gap 15 can be set to d+$\lambda/4$, a relative maxima, in the unbiased state. Under bias, the membrane moves a distance of $\lambda/4$ so that the resulting air gap has a size d, resulting in zero reflectivity.

Modulators according to the present invention can be operated so that the membrane 15 contacts the substrate 10 when the membrane is under bias. It is preferable, however, for the membrane to move toward the substrate under bias, but not contact it, as shown in FIG. 3. Avoiding such contact should result in better reliability and life for the modulator.

It has been observed that an instability exists when the membrane 15 travels toward the substrate 10 a distance of at least one-third of the height of the unbiased air gap 20. This instability causes the membrane 15 to be drawn toward and contact the substrate 10. Thus, even though maximum modulator contrast is obtained by having the membrane 15 move through one-quarter of the operating wavelength under bias, a smaller membrane travel may be preferable. A specific example of this phenomena, and its impact on modulator performance, is examined below with reference to one of the modulator embodiments previously discussed.

In the first embodiment, modulator reflectivity was zero when the air gap was about 6660 Å. A reflectivity maxima is observed at an air gap of about 10,535 Å. In moving from an unbiased air gap of 10,535 Å to a biased air gap of 6660 Å, the membrane travels a distance of 3,875 Å. Such a design would be subject to the aforementioned instability since 3,875 Å is about 37 percent of the height of the "unbiased" air gap. It is therefore preferable to shorten the membrane travel by decreasing the height of the unbiased air gap.

Membrane travel is preferably limited to about twenty-five to thirty percent of the height of the air gap when the membrane is in its unbiased position. For this example, the twenty-five percent figure will be used. As such, when the membrane is in its unbiased position, the air gap should be about 8880 Å. Referring to plot 50 of FIG. 8, modulator reflectivity is about 61 percent for an air gap of 8880 Å. Thus, limiting membrane travel in this manner reduces the reflectivity from a theoretical maximum of about 72 percent at 10,535 Å to about 61 percent at 8880 Å. While membrane travel is only about 57 percent of the desired $\lambda/4$, reflectivity remains relatively high at about 85 percent of the theoretical maximum. Furthermore, the contrast ratio remains very high since reflectivity approaches zero in the low reflectivity state. By sacrificing some reflectivity, bias voltage requirements are minimized and the instability is avoided.

Figure 9:
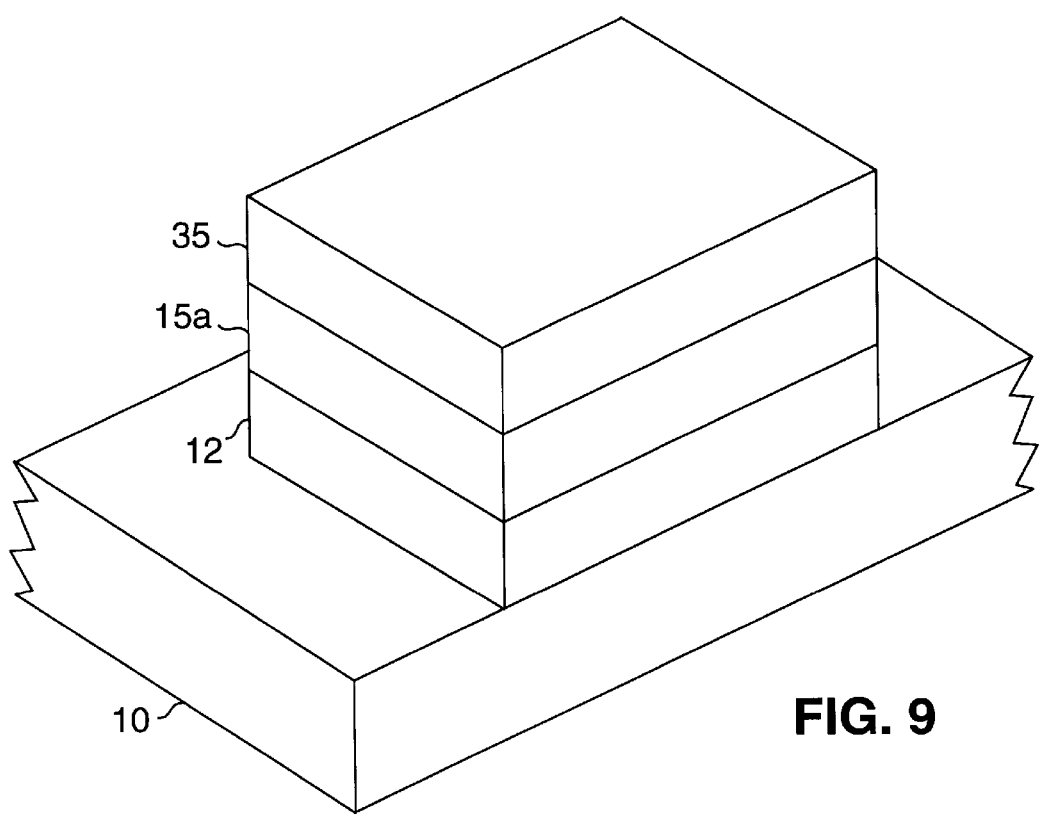
FIG. 9 is a perspective view of various layers of material deposited on a substrate, which layers will be patterned into a micromechanical modulator according to the present invention.

The micromechanical modulator 1 or 1a of FIGS. 1 and 2, or 4 and 5, respectively, can be formed as follows. The substrate 10, which may be in the form of a wafer, is preferably silicon which is doped with phosphorus or boron. As shown in FIG. 9, several layers of material, as described below, are deposited on the substrate 10. First, a sacrificial layer 12 of an erodible material may be deposited on the substrate. The erodible material is chosen so that a suitable wet etch will erode this material at a much greater rate than any other of the materials which comprise the device. Suitable erodible materials include, but are not limited to, silicon dioxide and aluminum. Preferably, the erodible material is phospho-silicate glass ("PSG"), e.g., silicon dioxide doped with phosphorus. The erodible material is deposited to a thickness approximately equivalent to that desired for the unbiased air gap 20.

A layer of polysilicon or other suitable material for forming the membrane as previously described is deposited to form layer 15a, as shown in FIG. 9. For clarity, the pre-patterned membrane layer will be identified by the reference numeral 15a, the membrane after patterning will be identified by the reference numeral 15. The layer 15a should be deposited to a thickness required by design equation [3]. As previously noted, the membrane layer preferably has a refractive index greater than the square root of the refractive index of the substrate. Techniques for tailoring the refractive index of a material are well known to those skilled in the art. See Smith et al., "Mechanism of SiNxHy Deposition from $N_2$—$SiH_4$ Plasma," Jnl. Vac. Sci. Tech. B(8), #3 at 551–57 (1990).

Photolithographic steps follow the deposition of these layers. The photolithographic process is well known to those skilled in the art and the details of this process will not be discussed in detail here. See Ruska, *Microelectronic Processing,* Chap. 4, "Photolithography," at 114–17 (1987).

Figure 10:
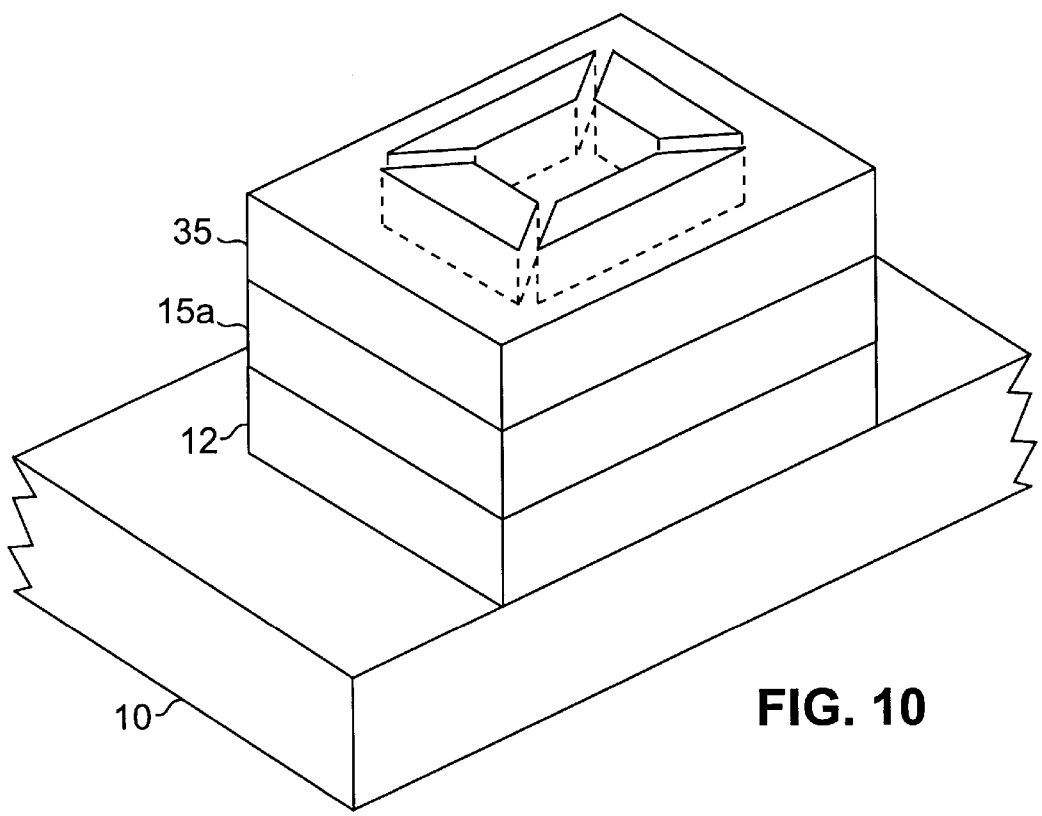
FIG. 10 shows the layers of FIG. 9 with holes patterned in the photoresist layer.

In the first photolithographic step, which may be referred to as the etch step, a photoresist 35 is applied to membrane layer, which is the layer 15a in the embodiment shown in FIG. 9. Four openings are then created in the photoresist layer, as shown in FIG. 10, using an appropriately patterned mask. The openings are shown as trapezoidal in shape. The shapes of the openings are a function of the desired support arm arrangement. In the micromechanical modulator 1 shown in FIGS. 2 and 5, the support arms 25 originate at the corners of a first square and terminate at the corners of a second smaller square (the membrane 15) located within the perimeter of first square. Thus, trapezoidal shaped openings define the structure. As previously discussed, the support arms 25 may be arranged in any convenient manner, may number more or less than four and may have any suitable physical configuration. For other support arm arrangements, the openings created in the photoresist layer may therefore differ in number and shape from those shown in the present example. Small openings, not shown, may be provided near the center of the membrane 15 to facilitate removal of a portion of the sacrificial layer 12 to create the air gap 20.

The layers located beneath the trapezoidal openings are removed using reactive ion etching or other suitable methods. By forming four trapezoidal shaped openings in the layer 15a, the support arms 25 and the membrane 15 are defined, as shown in FIG. 10. FIG. 10 is a cutaway view, wherein the material used for the layers 15a and the photoresist surrounding the structure are not shown. It should be understood that the membrane 15 and support arms 25 are surrounded by material comprising layers 15a and 35, other than the trapezoidal shaped regions which have been removed as described.

Hardened photoresist remaining on the structure is then removed. If a conductive layer 30 is to be deposited on the membrane 15, a second photolithographic step is required. In such a case, photoresist is applied and patterned using a second photomask. The areas of the device, if any, which are not to be coated with conductive material are protected by the hardened photoresist. In the embodiment shown in FIG. 11, conductive material is deposited at discrete regions on the membrane 15. Specifically, conductive material may be deposited at a region 24 extending beyond each of the support arms, on the support arms 25 and along the edge of the membrane 15 to form the border region 17, as shown in FIG. 5. The conductive material so deposited forms a continuous surface for electrical conduction, defining conductive layer 30. A contact 31 may be formed on the substrate 10 by depositing conductive material thereon.

Figure 11:
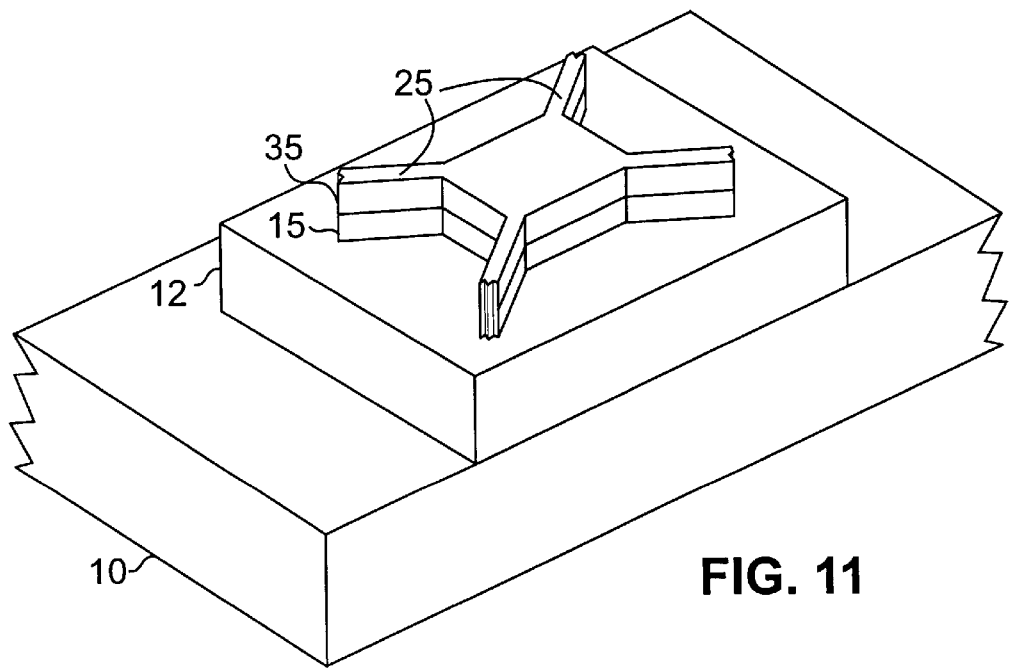
FIG. 11 is a cutaway view of the layers of FIG. 9 after patterning and etching to define the membrane and support arms.
Figure 12:
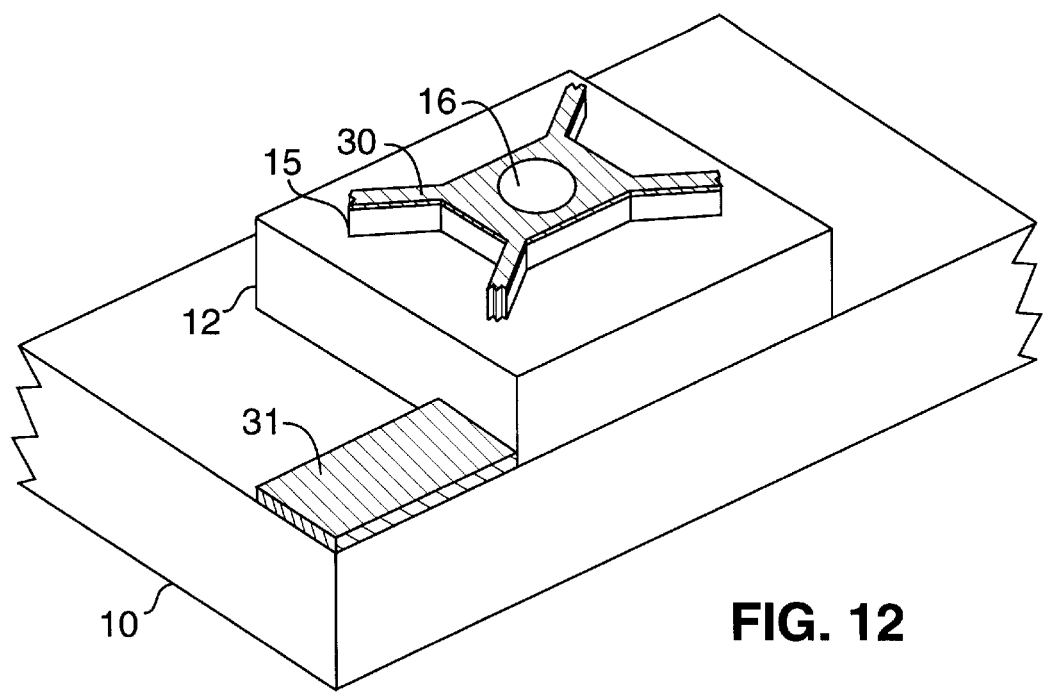
FIG. 12 shows contacts added to the arrangement shown in FIG. 11.
Figure 13:
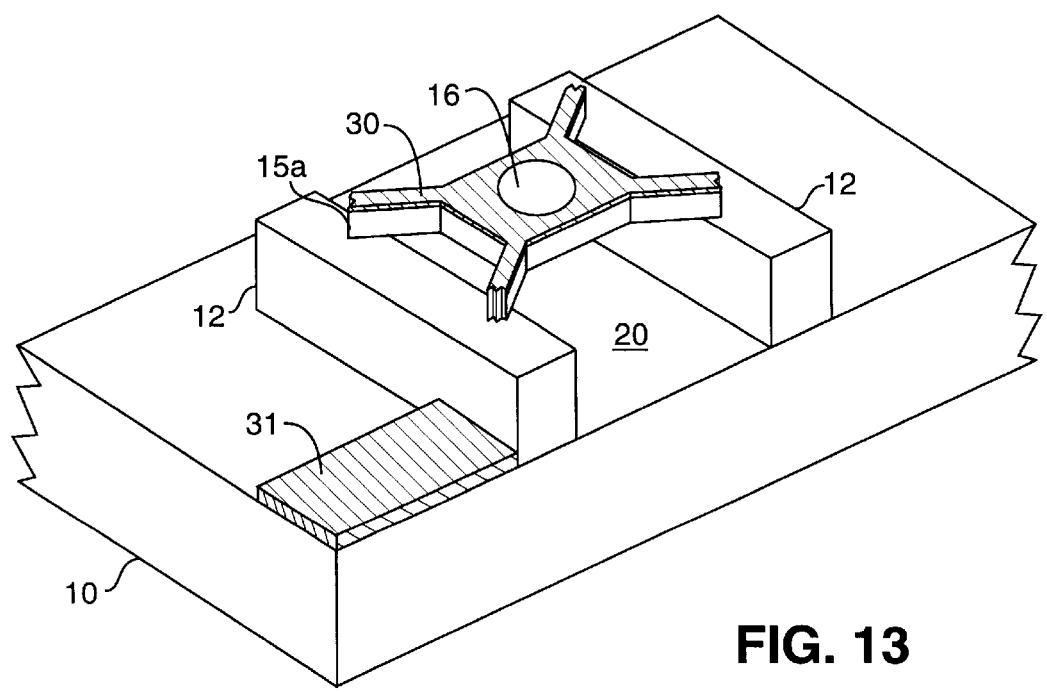
FIG. 13 shows the erodible layer etched away to form an air gap between the membrane and the substrate.

The structure is then placed in a suitable etch bath for etching the sacrificial layer 12 without attacking the membrane 15. Suitable etches include, but are not limited to, commercial aluminum etchant if the sacrificial layer is aluminum, and HF acid-based solutions for PSG or aluminum sacrificial layers. If the membrane 15 is formed of high index silicon nitride or polysilicon, fast HF acid etches can be used without a protective layer of photoresist. As shown in FIG. 11, the air gap 20 is formed as the portion of the sacrificial layer 12 beneath the membrane 15 and support arms 25 is removed. The etch is timed to limit the amount of undercut of the membrane.

Other embodiments of methods for forming the modulator of the present invention can be adapted from the methods disclosed in co-pending applications Ser. No. 08/478,590 and Ser. No. 08/479,476 and Ser. No. 08/283,106, except that membrane thickness and air gap are to be determined according to the methods of the present invention.

It should be understood that the embodiments and variations shown and described herein are illustrative of the principles of this invention and that various modifications may occur to, and be implemented by, those skilled in the art without departing from the scope and spirit of the invention.

I claim:

1. A phase-mismatched modulator for modulating an optical signal, comprising:

a substrate characterized by a reflectivity;

a membrane having an optically transparent portion and characterized by a reflectivity, a refractive index and a thickness, wherein the thickness and refractive index of the membrane are selected so that the membrane and substrate have phase-mismatched reflectivities;

a flexible support for positioning the membrane in a spaced and superposed relation to the substrate defining an air gap having a variable size; and a device that supplies a bias signal to the membrane and substrate; wherein, in the absence of the bias signal, the membrane has a first position and the air gap has a first size and, in the presence of the bias signal, the membrane moves to a second position and the air gap has a second size, and, wherein, in one of the first or second positions, substantially none of the optical signal received by the membrane and substrate is reflected from the membrane and substrate, and, in the other position, a substantial portion of the optical signal is reflected from the membrane and substrate.

2. The phase-mismatched modulator of claim 1, wherein membrane is selected from the group consisting of polysilicon and high refractive index silicon nitride.

3. The phase-mismatched modulator of claim 1, wherein at least a portion of the membrane is coated with a conductive material.

4. The phase-mismatched modulator of claim 1, wherein the substrate is characterized by a refractive index, and wherein the refractive index of the membrane is greater the square root of the refractive index of the substrate.

5. The phase-mismatched modulator of claim 4, wherein membrane thickness can be one of any of a plurality of acceptable thicknesses determined according to the expression:

$t=\lambda/(2\pi n)\{\pi/2+j\pi\pm\tan^{-1}[(n^2+1)(f-1)^{1/2}/2n]\}$, wherein, $\lambda$ is the wavelength of the optical signal;

$n_s$ is the refractive index of the substrate; n is the refractive index of the membrane; j=0,1,2, . . . ; and $f=[(n^2-1)/(n^2+1)]^2/[(n_s-1)/(n_s+1)]^2$.

6. The phase-mismatched modulator of claim 5, wherein j equals 0 and the thickness of the membrane can be one of either a first smaller thickness or a second larger thickness relative to each other.

7. The phase-mismatched modulator of claim 6, wherein one of either the first or the second size of the air gap is calculated according to the expression $d=\lambda/2\{1\mp\tan^{-1}[(f-1)^{1/2}]/(2\pi)\}$, and wherein the expression results in two values for the air gap, and further wherein if the thickness of the membrane is the first smaller thickness then the size of the air gap is the larger of the two values for d and if the thickness of the membrane is the second larger thickness then the size of the air gap is the smaller of the two values for d.

8. The phase-mismatched modulator of claim 6, wherein the thickness of the membrane is the first smaller thickness.

9. The phase-mismatched modulator of claim 7 wherein the first size of the air gap is d and the second size of the air gap is d−λ/4.

10. The phase-mismatched modulator of claim 7 wherein the first size of the air gap is d+λ/4 and the second size of the air gap is d.

11. The phase mismatched modulator of claim 7, wherein the first size of the air gap is d, and the second size of the air gap is greater than d−d/3.

12. The phase mismatched modulator of claim 7, wherein the first size of the air gap is such that the difference between the first size and the second size of the air gap is less than one-third of the first size, and the second size of the air gap is d.

13. A method for making a phase-mismatched micromechanical modulator having a substrate and membrane, each characterized by a refractive index, wherein the refractive index of the membrane is greater than the square root of the refractive index of the substrate, comprising the steps of:

providing a substrate;

forming a membrane so that the membrane and substrate have phase-mismatched reflectivities; and forming supports to support the membrane over the substrate so that an air gap is formed between the membrane and the substrate, wherein the supports are flexible so that the membrane may move from a first position relative to the substrate to a second position upon application of a force.

14. The method of claim 13 wherein the membrane is further characterized by a thickness t, and the step of forming a membrane further comprises selecting the thickness t and refractive index of the membrane so that the membrane and substrate have phase-mismatched reflectivities.

15. The method of claim 14 wherein the step of forming a membrane further comprises forming a membrane having a thickness t determined according to:

$t = \lambda/(2\pi n)\{\pi/2 + j\pi \pm \tan^{-1}[(n^2+1)(f-1)^{1/2}/2n]\}$, wherein, $\lambda$ is the wavelength of the optical signal;

$n_s$ is the refractive index of the substrate; n is the refractive index of the membrane; j=0,1,2, . . . ;

and $f=[(n^2-1)/(n^2+1)]^2/[(n_s-1)/(n_s+1)]^2$.

16. The method of claim 15 wherein the step of forming a membrane further comprises forming a membrane having a thickness t wherein j equals 0 so that membrane thickness can be one of either a first thickness or a second thickness, wherein the first thickness is smaller than the second thickness.

17. The method of claim 16 wherein the step of forming a membrane further comprises forming a membrane having the first thickness.

18. The method of claim 16, wherein the air gap has a first size when the membrane is in the first position, and a second size when the membrane is in the second position, and one of either the first or the second sizes of the air gap is calculated according to the expression $d = \lambda/2\{1 \mp \tan^{-1}[(f-1)^{1/2}]/(2\pi)\}$, wherein the expression results in two values for d, and further wherein if the thickness of the membrane is the first thickness then the size of the air gap is the larger of the two values for d and if the thickness of the membrane is the second thickness then the size of the air gap is the smaller of the two values for d.

19. The method of claim 18 wherein the first size of the air gap is d, and the second size of the air gap is $d - \lambda/4$.

20. The method of claim 18 wherein the second size of the air gap is d, and the first size of the air gap is $d + \lambda/4$.

21. The method of claim 18, wherein the first size of the air gap is d, and the second size of the air gap is greater than $d - d/3$.

22. The method of claim 18, wherein first size of the air gap is such that the difference between the first size and the second size of the air gap is less than one-third of the first size, and the second size of the air gap is d.

* * * * *